United States Patent Office 3,422,604
Patented Jan. 21, 1969

3,422,604
CHROMATOGRAPHY APPARATUS
Donald J. Haase, Ponca City, Okla., assignor to Continental Oil Company, Ponca, City, Okla., a corporation of Delaware
Filed Feb. 21, 1966, Ser. No. 528,727
U.S. Cl. 55—386      28 Claims
Int. Cl. B01d *15/08*

ABSTRACT OF THE DISCLOSURE

Chromatographic column containing an internal device adapted to re-shape the frontal profile of a component band; in one aspect, the device is non-symmetrical about the central axis of the column, and in another aspect, several variable mechanical device are provided.

---

Disclosure

This invention relates to chromatography, and more particularly, to improved chromatographic columns for use in separating or resolving a mixture of gaseous or vaporous materials so that components of the mixture can be detected, measured and/or collected. In a more specific, non-limiting aspect, the invention relates to novel structure which is mounted internally in a chromatographic column for improving the efficiency of the column.

In the now widely used technique of gas chromatography, or vapor fractometry, as it is sometimes termed, several conditions tend to exist or to develop within the chromatographic separating column over extended periods of time, which conditions reduce the separating or resolving efficiency of the column. Some of these conditions are wall effect, channeling and undesirable thermal gradients across the column cross-section. In one way or another, each of these conditions introduces distortion in the configuration of component concentration fronts moving through the column as the several components of a sample mixture are separated and moved through the column. For example, the wall effect commonly present in columns packed with solid particulate material permits fluid which is adjacent the column wall inside the column to move through the column faster than the portion of the fluid moving through the packing in the center of the column. The result is a distortion of the leading frontal edge of separated components into a concave configuration with the trailing edge being made convex, so that component overlap and undesirable tailing or leading of components occur, and the desired separation or analysis is deleteriously affected. The development of an undesirable thermal gradient, as well as the severity of the wall effect, is directly related to the diameter of the column with both undesirable influences increasing as the diameter of the column increases. The described undesirable effects are thus most significant in large scale preparative columns having a diameter of usually more than six inches and sometimes as much as several feet.

Although the undesirable effects of channeling, thermal unbalance and wall effect have been recognized, little effort has been made to eliminate or offset these results except in the case of distortion due to wall effect. In the case of this latter phenomena, it has been proposed to provide screens across the column, or to provide funnel-shaped flow redistributors in the column to reshape or re-orient the component concentration profiles after they have been distorted by the wall effect. Another device recently proposed for the purpose of combatting the distortion resulting from wall effect, channeling and thermal unbalance is the sparger unit disclosed in co-pending U.S. application Ser. No. 304,103 filed Aug. 23, 1963, now U.S. Patent 3,354,619 issued July 7, 1967, and assigned to the assignee of the present invention. This device generally works well in the average or most frequently occurring types of distortion due to wall effect, but is not as adaptable to the correction of unusual distortion of the component concentration fronts due to unusual thermal gradients within the column, random channeling and the like. Moreover, it would be desirable to provide a more economical apparatus and/or method for rectifying the described deleterious effects than the sparger unit if this could be done.

The present invention provides an improved, economical apparatus for reshaping and thermally equilibrating the component concentration profiles of component bands moving through a gas chromatography column after separation therein of at least some of the components of a fluid mixture passed into the column. The salient advantages of the apparatus of the invention over the few types of structures provided for generally equivalent purposes in the past are the economy with which the apparatus in its simplest form can be provided, the versatility or adaptability of the apparatus which permits it to be used in a variety of ways for tailoring the shape or profile of component bands moving through the column, and its efficiency in accomplishing the neutralization or removal of component profile distortion from the concentration zones of components moving through the column.

Broadly described, the apparatus of the invention comprises the combination with a gas chromatography column of the type having a solid particulate packing material in an elongated chamber, of means for reshaping the concentration profile of a material moved therethrough by a carrier gas. The reshaping means can function either mechanically or thermally, or in both ways, to reorient or reshape the concentration profile of a separated component. In all forms or embodiments of the invention, the reshaping means is characterized in having an impedance to gaseous component flow which varies in a radial (or cross-sectonal) direction across the column, or stated differently, in a direction normal to the direction of fluid flow through the column. The radial impedance gradient which thus characterizes the reshaping means can preferably be selectively controlled and varied by control means disposed externally of the column.

It is also preferable to construct the apparatus of the invention so that the concentration profile reshaping means is disposed in the column in a space free of column packing material. This permits the reshaping function of the apparatus to encounter less interference as a result of thermal shielding of the reshaping means by the positioning of packing particles in juxtapositon thereto, and also permits better assertion of the mechanical reshaping influences brought to bear on component profiles by the reshaping means used in some embodiments of the invention.

In one of the more versatile and specific embodiments of the invention, means is provided within the chromatographic column for sensing or determining the shape of the distorted concentration profiles of the several fluid components as they move through the column. Programming means is connected to the sensing means for receiving profile shape-indicating signals therefrom, and is also connected to an external control means of the type previously described as preferably being provided for selective control of the radial impedance gradient which characterizes the reshaping means located in the column. With this system, substantially any type of pronounced distortion which develops in the concentration profile of the component moving through the column can be automatically counteracted so as to remove the undesirable distortion and approach so-called "plug" or planar front flow of the components through the column.

From the foregoing epitomized description of the invention, it will have become apparent that a broad major object of the invention is to provide an improved chromatographic column for use in chromatography.

Another and more specific object of the invention is to reduce or eliminate the deleterious results of wall effect, channeling and undesirable thermal gradients in gas chromatography columns, and particularly, in large diameter columns.

An additional object of the invention is to provide a more economical, yet more effective apparatus for reshaping component concentration profiles in situ in a chromatographic column and controlled from outside the column to remove or reduce various types of concentration profile distortion which may develop within the column during the passage of the fluid mixture therethrough.

Yet another object of the invention is to provide a sensing, programming and control system for selectively tailoring the shapes of component concentration profiles in a gas chromatography column in response to the extent to which said profiles are effected by the natural characteristics of the column.

Other objects and advantages of the invention, in addition to those expressly mentioned above, will become apparent as the following detailed description of the invention is considered in conjunction with the accompanying drawings which illustrate certain embodiments of the invention.

Before referring specifically to the drawings, a better understanding of the invention will be facilitated by a brief discussion of the conditions of operation and technical terms utilized in the following detailed description of the invention. In gas chromatography, the separation of a part or all of the several components of a sample or feed mixture is effected by moving the vaporized sample through a packed column which contains a material which selectively adsorbs the several components of the mixture. The packing material is sometimes solid, and sometimes a solid coated with a stationary, relatively non-volatile liquid. In either case, the packing material demonstrates a differing, selective adsorptive affinity for the several components of the sample with the result that when a sample is pushed or pulled through the column with a flowing carrier gas, the several components of the mixture are retained in the column for differing lengths of times and are eluted in a sequence which allows them to be individually identified, measured and collected. The separation of the sample components in this way is referred to as resolution, and the efficiency and usefulness of analytical columns of this type is frequently discussed in terms of its resolving power, or its ability to cleanly and distinctly separate the several components of the mixture from each other in a relatively short time.

In the construction and use of chromatographic columns, the way in which the flow of fluids through the column is affected by column geometry, and by packing density and other physical characteristics is an important consideration. In an optimum flow pattern, the several components would be adsorbed and released by the packing in a uniform manner, and each component would then move through the column in a uniform, equal velocity pattern so that each zone of one component mixed with carrier gas in a high concentration would form a distinct, compact, geometrically symmetrical band spaced from every other component band separated by, and moving through, the column. This optimum type of flow will hereinafter be referred to as plug flow or planar front flow.

Unfortunately, optimum plug flow patterns of the type described are not attained due to a variety of factors inherent in column construction. The net effect of these factors is that flow of the individual bands of separated components, which will hereinafter be termed component concentration profiles, is not uniform and the concentration profiles for each component become distorted. Stated differently, the concentration profile of a given component will develop either a concavity, a convexity, or some other type of non-uniformity in a cross-sectional direction as measured in a plane extending normal to the path of the gases through the column, with such distortion occurring either at the front or leading edge of the profile, or at the trailing edge thereof, or, as is more frequently the case, at both the leading and the trailing edges. Distortion of the type described renders a clean-cut separation of the components by the column difficult, results in undesirable "tailing" in the eluted components with attendant difficulties in accurate identification and concentration measurements, and makes the isolation of high purity chemicals by this technique very difficult.

A major object of the present invention is to reduce the amount of distortion engendered in component concentration profiles, and to more nearly approach optimum plug flow through the column so that clean-cut separation of components can be achieved, and highly efficient preparative or industrial chromatography using large diameter chromatographic columns can be made a practical, easily practiced process. To better understand the manner in which the invention accomplishes this object, an understanding of the factors which contribute to distortion of concentration profiles is necessary. One of the most important of these factors is the so-called wall effect. The resistance to flow of fluids through a smooth walled column packed with solid particles is generally less at the interior surface of the column wall than through the solid particles in the center of the column. The result of this resistance differential is that that portion of the separated component vapors which is adjacent the column wall tends to move ahead of the portion of the component vapors in the center of the column, and a concavity develops in the front or leading edge of the concentration profile.

Akin in its usual influence to this result obtaining from the wall effect is the temperature gradient across the column cross-section. In most instances, the column will be operated at an elevated temperature and the source of heat will be external of the column. This arrangement results in the zone immediately adjacent the column wall being at a higher temperature than the packing in the center of the column. Of course, the opposite type of temperature gradient will result where the column is operated at very low temperatures which is more rarely the case. In either situation, the separated component vapors are caused to move more rapidly through the column in those zones where the temperature is higher, and in the more usual high temperature operation, the result is a reinforcement or aggravation of the wall effect distortion, i.e., the advance of the carrier gas and resolved component molecules adjacent the column wall faster than the gas molecules in the center of the column are advanced.

Another type of distorting influence which frequently is encountered in conventional packed chromatographic columns, particularly those which have been in use for some time, is referred to as channeling. In this case, either due to faulty, non-uniform packing of the column in the initial preparation thereof, or due to settling or shifting of the packing after extended periods of use, or due to abusive use of the column, a differential porosity across the column packing is created, or stated differently, channeling develops in the solid packing material which permits gases to flow at an uneven rate in a lengthwise direction through the column. This results in fingering or random distortion in the component concentration profile in which some parts of the concentration profile front move out far in advance of other parts, and the same type of distortion is usually perceptible in the trailing edge of the component concentration profile.

In combatting the described distorting influences which are inherently present in most packed columns, the present invention makes use of what are hereinafter termed "internals" and "mixing zones." The internals used in the invention are structures which are inserted in the packed column at some point along its length, which generally extend transversely in the column, and which functions to reshape or reorient the component concentration profiles moving through the column. The reshaping of the profiles is, in some instances, accomplished mechanically due to the geometric shape or porosity characteristic of the internal; in some instances, is accomplished thermally by the establishment of desirable temperature gradients within the internal; and, in some instances, is accomplished by both mechanical and thermal means.

By mixing zone, as the term is hereinafter employed, is meant an open or unpacked space within the column, and most frequently, though not exclusively, disposed between two packed sections of the column. Within these mixing zones, several effects occur which deserve understanding and recognition. First, it should be noted that for laminar gaseous flow in an open mixing zone of the type described, an effect which is the opposite of wall effect occurs. Thus, the gas molecules adjacent the column wall move more slowly through the column than those centrally disposed in the open mixing zone, and the component concentration profile tends to develop a convex appearance at its leading edge and a concave appearance at its trailing edge.

Another effect which occurs in the mixing zones is an enhancing of the momentum and thermal exchange between gas molecules in a cross-sectional direction (that is, in a plane normal to the axis of fluid flow in the column). Thus, any existing temperature gradient across the column tends to be eliminated, and temperature equilibration is effected. Also, higher velocity portions of the moving front tend to yield some of their molecular energy to the slower moving gas molecules in the concentration profile. This is in part due to the opportunity for a greater degree of mixing of the gases to occur in a cross-sectional direction in the open mixing zone than can occur in the packed column.

Finally, where an internal is disposed in a mixing zone, the profile reshaping influence of the internal on the moving gases is greater than is the case where the internal is located in a packed section of the column in contact with the column packing material. This is because more of the gas molecules in the component profile actually "see" the internal in a mixing zone, than "see" this structure in a section of the column where the internal is blocked or obscured by packing material.

It should be understood that in the following discussion, where the terms "gas" or "gaseous" are employed, they are intended to connote both gases and vapor as the latter terms are generally understood.

Figures 1, 2, 3:
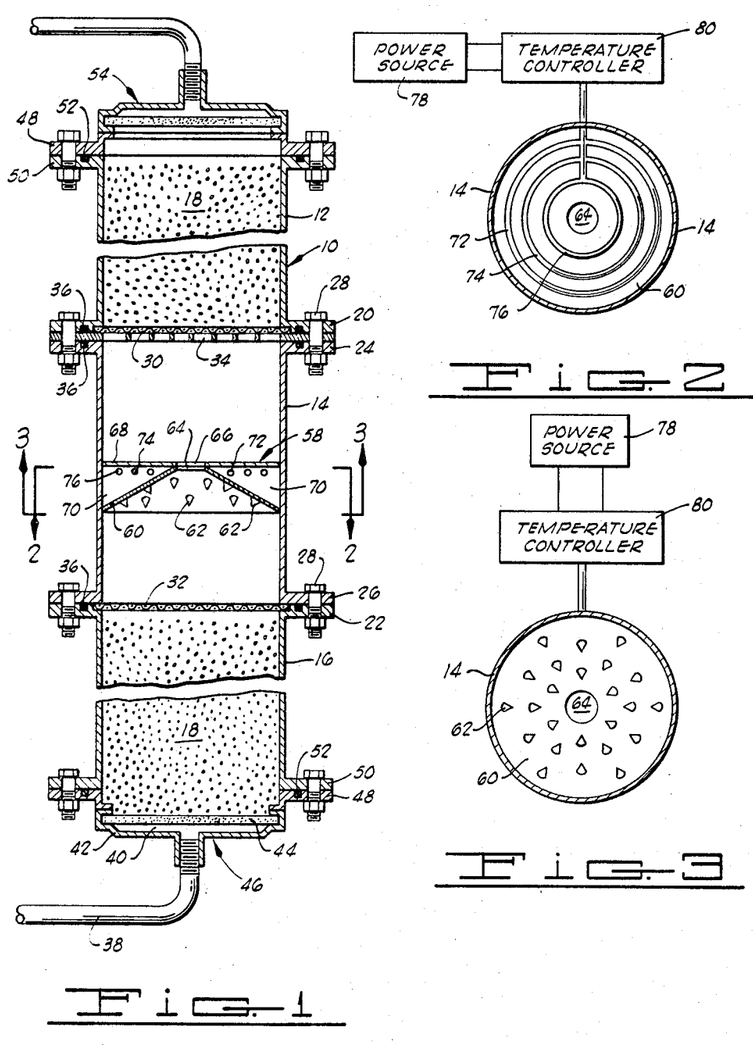
FIGURE 1 is a vertical sectional view through a multi-section chromatographic column constructed in accordance with one embodiment of the present invention.
FIGURE 2 is a sectional view taken along line 2—2 of FIGURE 1 and further schematically illustarting the manner in which a temperature control device is connected with a portion of the apparatus illustrated in FIGURE 1.
FIGURE 3 is a sectional view taken along line 3—3 of FIGURE 1, and also schematically illustrating the manner in which a temperature control device is connected to a portion of the apparatus illustrated in FIGURE 1.

With the foregoing considerations in mind, reference is now made to FIGURES 1–3 of the drawings.

A chromatographic column constructed in accordance with the present invention is designated generally by reference numeral 10. The illustrated column is a multi-sectioned column and includes tubular upper, central and lower sections 12, 14 and 16, respectively. The central tubular column section 14 will be hereinafter referred to as a mixing zone section to distinguish it from the packed sections 12 and 16. The column packing material employed in the packed sections 12 and 16 is a fine, particulate solid material 18 which may be a variety of substances whose characteristics are well understood in the art. The particulate solid material 18 may be coated with a relatively non-volatile, stationary liquid in which the components of a sample to be directed through the column are selectively adsorbed.

The lower end of the upper column section 12 and the upper end of the lower column section 16 are connected to the mixing zone section 14 by flanges 20 and 22, respectively, which are secured to upper and lower flanges 24 and 26 of the mixing zone section by bolts 28 or other suitable means. The flanges 20 and 22 of the upper and lower column sections 12 and 16 are relieved in order to accommodate relatively fine mesh screens 30 and 32 which extend transversely across the column. The upper screen 30 is supported on a perforated plate 34 which is positioned between the flanges 20 and 24 and provides a rigid support for the screen and the particulate packing material resting thereon. Suitable O-rings 36 are positioned between the connected flanges of the column sections to prevent the escape of gas from the column.

In utilizing the column 10, carrier gas and sample are introduced to the lower end of the column by a suitable vapor inlet conduit 38 and this gaseous mixture initially enters a chamber 40 defined by a funnel-shaped member 42 and a porous disc 44 constructed of a rigid material. The funnel-shaped member 42 and the porous disc 44 together form a sparger unit 46 which functions in the manner described in co-pending United States application Ser. No. 304,103 filed Aug. 23, 1963, and assigned to the assignee of the present invention. The sparger unit 46 is secured to the lower end of the column 10 by bolting together circumferential flanges 48 and 50 carried by the sparger unit and the lower end of the bottom column section 16, respectively. An O-ring seal 52, or other suitable sealing member is provided to prevent the escape of gas between the connected flanges. At the upper end of the column 10, a second sparger unit 54 constructed substantially identically to the sparger unit 46 is provided for collecting and removing resolved sample components and carrier gas from the column. The sparger unit 54 is connected to the upper end of the packed column section 12 by a flange connection substantially identical to that used in connecting the lower packed section 16 to the lower sparger unit 46.

Positioned centrally in the mixing zone column section 14 of the column 10 is a component concentration profile reshaping internal designated generally by reference numeral 58. The internal 58 includes a frusto-conically shaped metallic plate 60 which carries a plurality of small metallic protrusions 62 on the internal face of the plate 60. An aperture 64 is provided at the apex and in the center of the frusto-conical plate 60 and is aligned with an aperture 66 in a substantially monoplanar disc-shaped plate 68 positioned above the plate 60. Both the frusto-conical plate 60 and the disc-shaped plate 68 are secured at their outer edges to the internal wall of the mixing zone section 14 and define between them a space 70. As best illustrated in FIGURE 2, a plurality of annular heating elements 72, 74 and 76 are positioned in the space 70 and are concentrically arranged relative to each other and relative to the apertures 64 and 66 through the plates 60 and 68.

For the purpose of selectively controlling the temperature to which each of the annular or ring-shaped heating elements 72, 74 and 76 is brought during the operation of the column 10, a suitable source of electrical power 78 and a temperature control device 80 are connected to the several annular heating elements 72, 74 and 76 and function to selectively heat each of the heating elements by the application of a supply of electrical power thereto. Controls for selectively and individually increasing the temperature of the several heating elements 72, 74 and 76 are well known in the art and have been schematicaly illustrated in the drawings of the present invention to avoid unnecessary detail.

The manner in which the described apparatus functions in beneficially reshaping concentration profiles as they are developed within the chromatographic column 10 can best be explained by referring to FIGURES 4A-4E of the drawings. Assume initially that a carirer gas with a vaporized sample mixture entrained therein is being introduced to the bottom of the column through the inlet pipe 38. The vaporized sample is initially evenly distributed upon the packing 18 in the lower section 16 of the column by the action of the sparger unit 46 as described in greater detail in co-pending application Ser. No. 304,-103, to which reference has hereinbefore been made. As the sample mixture is swept upwardly in the column by the carrier gas, the selective adsorption effect of the solid packing material, or of the stationary liquid substrate which is disposed on the surface thereof, effectively separates the components of the sample mixture from each other by retaining the different components for different lengths of times in a state of adherence to, or solution in, the packing material. As the sample components are separated by the packing, each separated component continues to move upwardly in the column in the form of a zone or band in which the sample component is of particularly high concentration in the carrier gas. This zone will generally have fairly well defined boundaries unless overlap of one component concentration zone with another component concentration zone occurs. The occurrence of such overlapping can occur as a result of distortion of the concentration zones due to the column effects hereinbefore described.

Figure 4A:
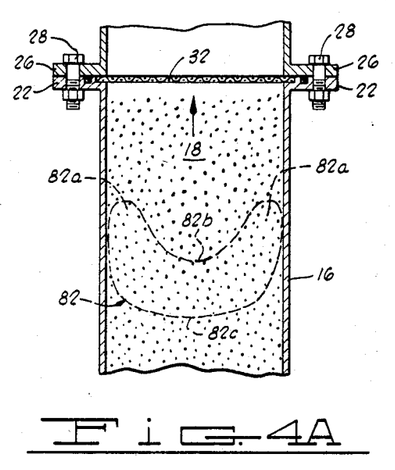
FIGURES 4A–4E are partially diagrammatic views illustrating the manner in which a component concentration profile is altered as it passes through the chromatographic column depicted in FIGURE 1.

In FIGURE 4A, the component concentration profile 82 of one of the components which has been separated by the packing material in lower packed section 16 of the column is illustrated by a dashed line. The illustrated concentration profile has assumed the shape depicted due to the wall effect prevailing in the packed section 16 of the column. Thus, the profile 82 has a generally concavely shaped leading edge with the portions 82a of the profile which are adjacent the wall of the packed column section 16 advancing more rapidly up the column than the portion 82b of the profile disposed in the center of the column. This distortion will become greater the further the component moves through the packed column section since the wall effect will continue to act throughout the section. The trailing edge 82c of the component concentration profile is generally convexly shaped, also as a result of the wall effect present in the column.

Figure 4B:
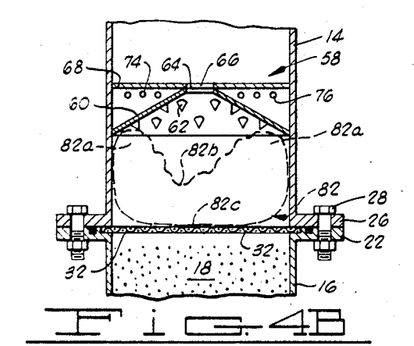

As the gas of the separated component passes through the screen 32 located at the top of the lower section 16, the screen tends to promote some turbulent mixing of the gases moving upwardly in the column with the result that the concentration profile 82 is distorted roughly to the configuration illustrated in FIGURE 4B as the component moves through the screen into the mixing zone 14. Some corrective distortion of the profile 82 also results from the phenomena hereinbefore mentioned of the central portion of the gases moving faster than those portions of the gases adjacent the wall in an open column section where the fluid flow is laminar.

Figure 4C:
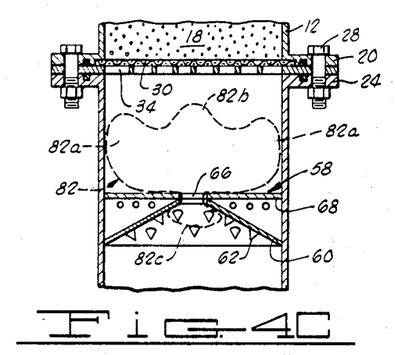

As the separated component strikes and moves through the internal 58, its concentration profile 82 is reshaped generally as depicted in FIGURE 4C. Thus, the radially outer portions 82a are drawn inwardly by the frusto-conical plate 60, passed back over the disc-shaped plate 68 toward the walls of the mixing zone section 14 and then begin to move upwardly along the walls. During this time, however, the central portion 82b of the component band has moved through the apertures 64 and 66 and is slightly leading the radially outer portions 82a.

Figure 4D:
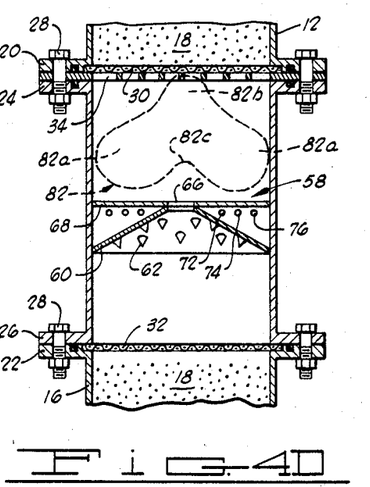

In FIGURE 4D, the separated component concentration zone has moved into the free space at the upper end of the mixing zone section 14 and, by virtue of its laminar flow in this open section, has assumed the profile there illustrated. Thus, the central portion 82b of the profile 82 is advancing away from the radially outer portions 82a, and the trailing edge 82c of the profile demonstrates a noticeable convexity also as a result of the distortion characteristic of laminar flow occurring in an open mixing zone.

Figure 4E:
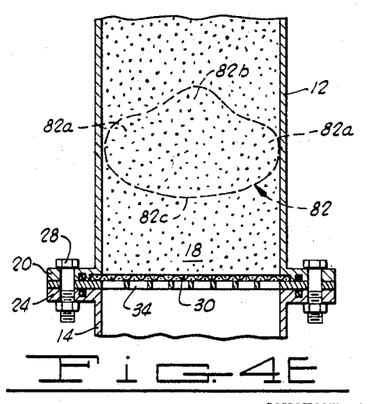

In FIGURE 4E, the separated component band has entered the upper packed section 12 of the column 10 and has assumed the configuration illustrated in this figure. It will be noted that the component concentration profile 82 is now more nearly a plug or planar front profile than at any previous time during its travel through the column. This approach toward the optimum configuration of the component concentration profile has been furthered by the effect of the perforated metallic plate 34 and the screen 30, and by the wall effect obtaining in the packed section 12. Thus, as the component band having the concentration profile shown in FIGURE 4D moves through the perforated plate 34 and screen 30, some mixing is again engendered tending to redistribute the differing momentum characteristics of the gaseous molecules in the concentration band to achieve an evenness of velocity throughout the band. Following this, the wall effect obtaining in the packed section 12 tends to permit the radially outer portions 82a of the component profile to overtake or catch up with the central portion 82b of the band. The component concentration profile is thus approaching a planar leading edge and is also approaching a planar condition at its trailing edge 82c. As the component band continues to move upwardly in the packed section, this reshaping of the profile in this desirable direction will continue to occur and, provided the length of the packed section 12 is not excessive, the component will be eluted from the column and passed to a detector with its concentration profile 82 quite close to the plug flow profile which is optimum. A clean-cut separation can thus be obtained from components ahead of and behind the particular component which has been subjected to the profile reshaping procedure thus described.

The annular heating elements 72, 74 and 76 which are provided in the internal 58 provide greater versatility in the use of the internal for its intended function of desirably reshaping or reorienting the concentration profiles of components resolved by the column. Thus, as has previously been explained, the effect of the existence of a temperature gradient across the column is to accelerate the molecules coming in contact with the region of higher temperature so that this portion of the separated component band moves at a faster rate through the column than that portion or portions which contact a region of lower temperature. This principle is employed in the control of the heating elements 72, 74 and 76 to reorient or reshape the component concentration profile in a desired manner. Thus, by first removing the plates 60 and 68 and by providing a higher temperature in the heating element 72 adjacent the openings 64 and 66 through the internal 58 than is provided in the heating elements 74 and 76, the convex configuration of the leading edge of the profile 82 as shown in FIGURE 4D can be accentuated, and the central portion 82b of the profile can be made to move faster upwardly in the column than the outer portions 82a of the profile.

Conversely, should an effect of channeling as hereinbefore described result in fingering of the component concentration profile toward the center of the column (as were a crack or fissure develops in the center of the packing bed 18 in the lower section 16) so that the component profile approaching the internal 58 in the mixing zone section 14 develops a convex rather than a concave leading edge, the reverse actuation of the heating elements 72, 74 and 76 would be desirable, that is, it would be then desirable to bring the radially outer heating element 76 to a higher temperature than the inner heating elements 72 and 74 so as to accelerate the movement of the outer portions 82a of the component profile with respect to the radially inner portion 82b thereof.

It will be readily apparent that the control of the temperatures in the heating elements 72, 74 and 76 can be selectively varied to provide several different types of thermal gradients across the column 10 at the location of the internal 58. It will be further apparent that by the provision of a greater number of annular heating elements, or by modification of their geometric configuration, substantially any type of influence which might be desired can be brought to bear on the component band moving through the internal 58, and the reshaping of the component concentration profile can be tailored as may be necessary to overcome substantially any type of distortion. As a general proposition, it may be stated that the artificial thermal gradient created by the selective heating of the heating elements 72, 74 and 76 should be approximately opposite the natural thermal gradient existing in the column as a result of external heating thereof in accordance with conventional practice. Thus, the counteracting effect of the thermal gradient produced by the heating elements 72, 74 and 76 can be made opposite of the distorting effect produced by the thermal gradient existing across the packed sections of the column as a result of the application of external heat to the column as necessary for carrying out the chromatographic analysis or preparation.

It should be noted, of course, that the plates 60 and 68 can be left in place, and the heating elements 72, 74 and 76 used conjunctively therewith to accentuate the effect of these plates by heating them to an elevated temperature.

Figure 5:
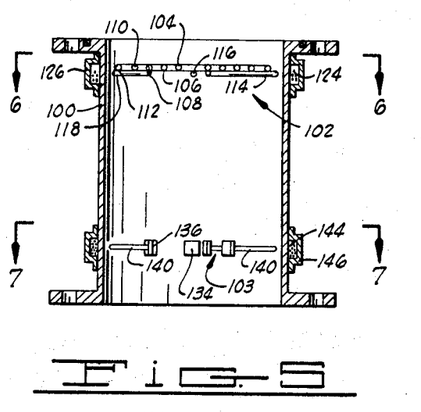
FIGURE 5 is a vertical sectional view through an open central section of a chromatographic column constructed similarly to the arrangement shown in FIGURE 1, but providing in said central section of the column a different structure for reshaping a component concentration profile moving through the column.
Figure 6:
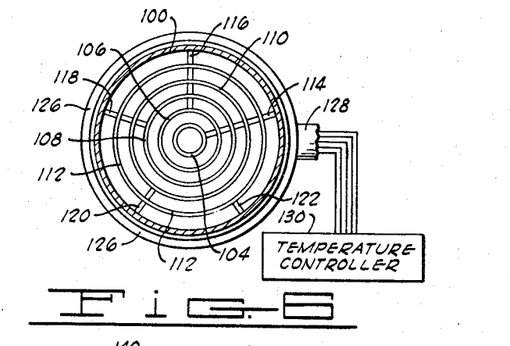
FIGURE 6 is a sectional view taken along line 6—6 of FIGURE 5.

In the different embodiment of the invention illustrated in FIGURE 5 of the drawings, a mixing zone column section 100 is illustrated and is adapted to be connected between packed column sections in substantially the same manner as the mixing zone section 14 illustrated in FIGURE 1. Disposed within the mixing zone section 100 is an internal 102 which is utilized for reshaping component concentration profiles in a manner hereinafter described. Positioned upstream from the internal 102 with respect to the direction of fluid flow, is an array of component sensing elements designated generally by reference numeral 103. The internal 102 comprises a plurality of annular heating elements which may take the form of electrically conductive metal bars, or may be hollow pipe sections containing resistance wires. The annular heating elements as they appear from the center of the column in a radially outward direction are numbered 104, 106, 108, 110 and 112, respectively. Radial pipes or conduits 114, 116, 118, 120 and 122 (see FIGURE 6) enclose electrical leads which convey electrical current to the heating elements 104–112, respectively.

The radial conduits 114–122 open through the wall of the mixting chamber section 100 of the column into a circumferential chamber 124 enclosed between the exterior wall of the section 100 and a circumferentially extending, annular bracket 126 which surrounds the column section and is sealingly engaged with the outer wall of the column section. From the chamber 124, the electrical leads to each of the heating elements 104–112 pass outwardly through a conduit or pipe section 128 and are connected to a temperature control device 130. This device is illustrated schematically in FIGURES 6, 7 and 8 and functions in a manner hereinafter described to selectively control the electrical current applied to each of the annular heating elements 104–112.

Figure 7:
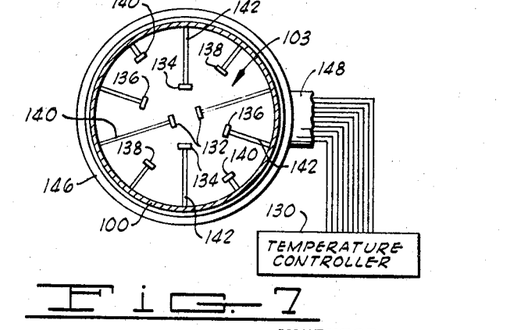
FIGURE 7 is a sectional view taken along line 7—7 of FIGURE 5.

Referring to FIGURES 5 and 7, the array 103 of component sensing elements comprises a plurality of thermistor pairs 132, 134, 136, 138 and 140 which are mounted on the inner ends of a plurality of radially extending support arms 142. The support arms 142 are preferably tubular members which are secured at their radially outer ends to the inner wall of the column section 100 and communicate with openings through the wall of the column section and with a chamber 144 formed between the external wall of the column section and an annular bracket 146 which sealingly engages the outer periphery of the column section. It will be noted in referring to FIGURE 7 that the arrangement of the thermistors 132–140 is such that the thermistors are disposed at varying radial distances from the center of the column, and may be said to be arrayed in pairs on five concentric imaginary rings which are coaxially oriented with respect to the longitudinal axis of the column section. Electrical leads extend from each of the thermistors 132–140 through the respective tubular, radially extending supporting arms 142 into the chamber 144 disposed outside of the column. From the chamber 144 the leads extend through a protective pipe or conduit 148 to the temperature control apparatus 130.

Figure 8:
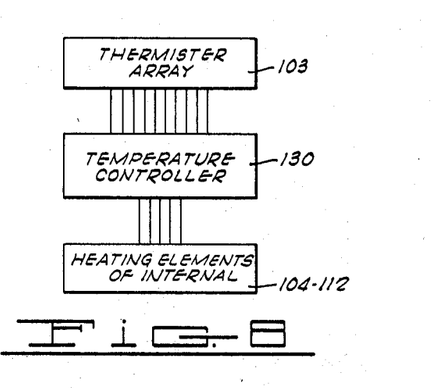
FIGURE 8 is a schematic electrical wiring diagram illustrating the manner in which the concentration profile reshaping apparatus used in the embodiment of the invention depicted in FIGURE 5 is controlled in response to the type of component concentration profile distortion developed in the column.

The electrical circuitry relationship between the thermistors 132–140 and the several heating elements 104–112 in the internal 102 is schematically portrayed in FIGURE 8. Thus, the thermistors 132–140 are electrically connected to the temperature control system 130, as are the several heating elements 104–112. The function of the temperature control apparatus 130 is to respond to signals received from the thermistors 132–140 and, in such response, to selectively control the temperatures to which the heating elements 104–112 are brought by the passage of electrical current thereto. Temperature control apparatus which is capable of functioning in the described manner is well within the understanding of those possessing ordinary skill in the electrical and electronic arts (as evidenced by technical information set forth in the literature, such as the General Electric Concontrol appaartus which is capable of functioning in detail herein in order to simplify the explanation of the present invention.

In the operation of the embodiment of the invention illustrated in FIGURES 5–8, the resolved components enter a chromatographic column in the manner previously described and in passing through the packed section 16 of the column are resolved or separated and assume a distorted concentration profile due to wall effect, undesirable temperature gradients, channeling or a combination of these factors. As the component band moves into the mixing zone column section 100, the configuration of the component concentration profile is actually sensed by the thermistors 103. The nature of this detection by the thermistors is well understood by the art, and may resemble generally detection of the eluted components by conventional thermal conductivity detector systems as now utilized in chromatographic analysis systems. Thus, by assuming the wall effect to have resulted in that portion of the component band which is adjacent the walls of the chromatographic column to have advanced well ahead of the central portion of the component band, the thermistors 140 located nearest the wall of the column section 100 will initially detect the passage up the column of these external portions of the component band, and will develop a signal which is input to the temperature controller 130. When the lagging central portion of the leading edge of the component band arrives at the centrally disposed thermistors 132, these elements will also sense the presence of that portion of the component band and will develop a signal received in the thermal control apparatus 130. Of course, this signal will occur later in time than the signal received from the thermistors 140.

In response to the detection and identification of the component concentration profile approaching the internal 102 by the thermistors 132–140, the temperature control apparatus 130 will selectively energize the heating elements 104–112 for the purpose of reshaping or reorienting the component concentration profile to remove the distortion therefrom in order to more nearly approach a plug flow status within the column. In the hypothetical example under discussion, the temperature control apparatus 130 would heat the radially innermost heating element 104 to the highest temperature, and would heat the remaining heating elements to a lower temperature so that a thermal gradient is established across the column by the heating elements with the highest temperature being at the center of the column with decreasing temperature extending outwardly therefrom to the wall of the column. The result of this arrangement would be to accelerate the movement of the gas at the center of the component band in relation to the gas at the outer periphery of the component band or adjacent the wall of the column section 100 so as to reduce or eliminate the concavity of the leading edge of the component band, and also to reduce the convexity of the trailing edge of this band. From the description of the embodiment of the apparatus depicted in FIGURES 5–8, it will be apparent that regardless of the character of the distortion which has been engendered in the component concentration profile of component bands moving up the column, the arrangement of thermistors and heating elements described can effectively reduce or eliminate such distortion.

Figure 9:
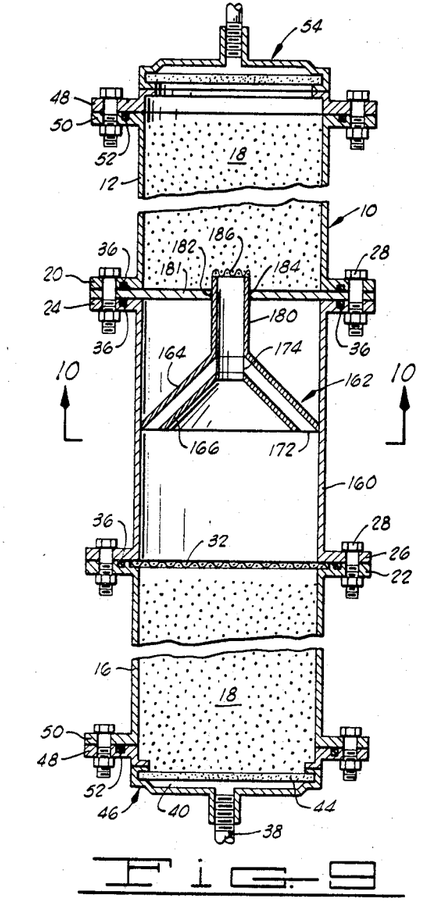
FIGURE 9 is a vertical sectional view through a multi-section chromatographic column, such view being generally similar to FIGURE 1, but illustrating another embodiment of the invention.
Figure 10:
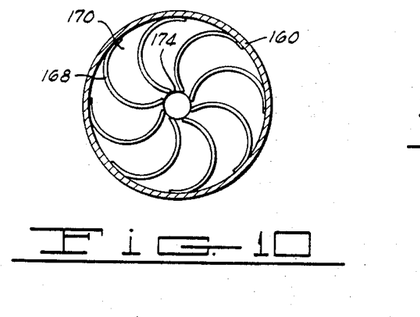
FIGURE 10 is a sectional view taken along line 10—10 of FIGURE 9 with the plate 166 removed to better illustrate certain structure.

Another embodiment of the invention is illustrated in FIGURES 9 and 10. Here the upper and lower packed section 12 and 16 of a column 10 are constructed identically to the upper and lower packed sections depicted in FIGURE 1, and the sparger units used to introduce and remove carrier gas and the sample to and from the column are also identical. To the extent that identical structure is utilized in the embodiments depicted in FIGURES 1 and 9, identical reference numerals have been utilized in referring to identical parts of these structures.

In the embodiment of the invention illustrated in FIGURE 9, a mixing zone column section 160 is positioned between the upper and lower packed sections 12 and 16 respectively, and surrounds a centrally positioned internal designated generally by reference character 162. The internal 162 includes a pair of spaced, congruent or complementary frusto-conical baffle plates 164 and 166. The upper and lower baffle plates 164 and 166, respectively, define between them a space in which is located a plurality of semicircular vanes 168 best illustrated in FIGURE 10, which is a view of the internal 162 from below the internal in the column, with the lower frusto-conical plate 166 removed. The semicircular vanes 168 define between them a plurality of vortical passageways 170 which extend from an annular opening 172 between the lower ends of the frusto-conical plates 164 and 166 to an opening 174 between the upper ends of the two plates.

At their apex, each of the frusto-conical plates 164 and 166 has an opening formed therein, and an upwardly extending discharge spout 180 is secured to, and extends upwardly, from the upper frusto-conical plate 164. The discharge spout 180 communicates with the opening 174 to the vortical passageways 170, and with the opening at the apex of the lower frusto-conical plate 166. The upwardly extending discharge spout 180 is disposed centrally in the column 10 and extends upwardly through apertures 182 and 184 formed in non-perforated packing supporting plate 181. A fine mesh, relatively thick and rigid screen 186 is positioned across the top of the discharge spout 180 to prevent packing material from entering the spout.

The embodiment of the invention depicted in FIGURES 9 and 10 differs from previous funnel type flow redistributing systems proposed by the prior art, and from the internal 58 depicted in FIGURE 1 in its ability to effectively decrease the total length of a component concentration band moving through the column. It will be noticed in referring to the internal 162 illustrated in FIGURES 9 and 10 that two different flow paths are provided by this structure. Gases moving upwardly in the center of the column will thus follow a flow path inside the lower frusto-conical plate 166 and will pass through the opening formed at the apex thereof. Gases adjacent the wall of the column section 160, however, will enter the opening 172 between the lower ends of the plates 164 and 166 and will move through the vortical passageways 170 and through the opening 174. In following this route, the radially outer, advanced portions of the component band will be brought in toward the center of the column, and will fill in the gap or concavity existing at the leading edge of the component concentration profile.

Thus, the total component gas content of the band will be compacted, and will be distributed in a smaller volume of the column, and the total length of this band as measured lengthwise of the column will be smaller after it emerges from the discharge spout 180 into the solid packing 18 of the upper column section 12 than was the length of the component band in its distorted form as it approached the internal 162. The spacing between the separated component bands as they move through the column 10 will thus be increased, and better resolution achieved as a result of the compaction of the several bands through the action of the internal 162. It will be necessary, of course, to use the internal 162 illustrated in FIGURES 9 and 10 for a given set of column conditions, and the length of the vortical flow passageways 170 in the internal may be varied according to the extent of the distortion which characterizes the component band as it approaches the internal. It should be noted that where channeling effects in the central portion of the packing in the lower section 16 have caused some fingering or departure from the concave distortion generally promoted by wall effect, this can be in part compensated or reduced by the inclusion of a fine mesh screen extended across the column immediately below the internal 162 in order to promote turbulence, and thus tend to smooth out or eliminate such channeling effects, which will usually be relatively minor in comparison to distortion due to wall effect. The pressure drops through the vortical passageways 170 should be adjusted so that no substantial tendency exists for direct flow to occur between the advanced gases adjacent the column wall and the more slowly moving gases centrally located in the column.

Figure 11:
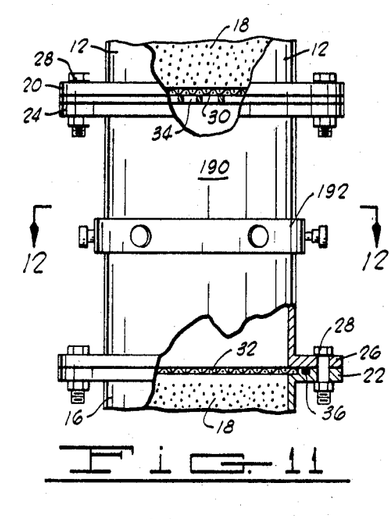
FIGURE 11 is an elevational view of one intermediate portion of a multi-section chromatographic column constructed in accordance with the present invention, with portions of the column being broken away to better illustrate the relationship of packing material to packing supports and mixing zones within the column.
Figure 12:
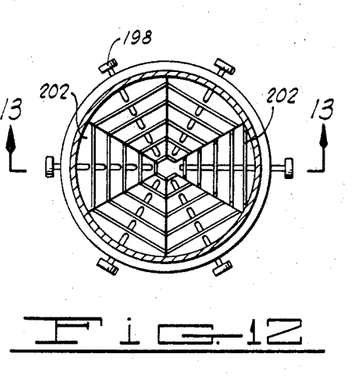
FIGURE 12 is a sectional view taken along line 12—12 of FIGURE 11.
Figure 13:
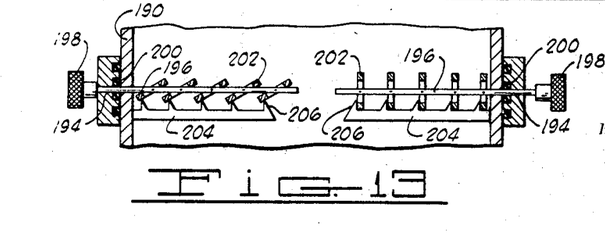
FIGURE 13 is a sectional view taken along line 13—13 of FIGURE 12.

Another embodiment of the invention is depicted in FIGURES 11–13. In this embodiment, a mixing zone column section 190 is disposed between the packed upper and lower column sections, 12 and 16, respectively. A rigid, relatively thick annular band 192 surrounds the column section 190 at approximately the center thereof and is provided with a plurality of circumferentially spaced apertures 194 through which are passed elongated control rods 196 (see FIGURE 13). Knurled knobs or handles 198 are provided on the outer ends of the control rods 196, and a small annular sealing member, such as an O-ring 200, is provided around each control rod 196 where it enters the wall of the column section 190 in order to provide a gas tight seal preventing loss of gas from the column by escape around the control rods.

Inside of the mixing zone column section 190, each of the control rods 196 pivotally carries a plurality of movable louver vanes 202. As shown in FIGURE 12, the louver vanes 202 are formed in coincidence with chords of concentric imaginary circles which are disposed coaxially in the column section 190. The louver vanes 202 are of decreasing length from the radially outer portion of the column section 190 to the center of this section. The arrangement of, and spacing between, the louver vanes 202 mounted on each of the control rods 196 is such that the louver vanes 202 on each control rod can be pivoted between open and closed positions without interference from the louver vanes on the adjacent control rods.

Extending beneath each of the control rods 196 and spaced downwardly therefrom in the column section 190 is a stationary vane actuator rod 204. Each vane actuator rod 204 includes upwardly projecting tines 206 which bear against and cooperate with the lower edge portions of each of the louver vanes 202. In referring to FIGURE 13, it will be noted that actuation of the louvers between a closed and an open position is effected by pushing in or pulling out on the respective control rods 196 so as to produce a cooperative action between the control rods and the stationary vane actuator rods 204 which causes the louver vanes 202 to pivot. In FIGURE 13, the bank of louver vanes 202 to the left are shown in their closed position while the bank of louver vanes to the right is in its open position.

The embodiment of the invention illustrated in FIGURES 11–13 functions by mechanically reshaping or reorienting the component concentration profiles entering and moving through the mixing zone section 190 of the column. It will be understood that the rate of movement through the column of any portion of the frontal or leading edge of a component band is proportional to the resistance offered to such movement by any obstruction within the column. Thus, when the louver vanes 202 on any one of the control rods 196 are biased by movement of the control rod to their closed position, maximum resistance is offered to the movement of gases in that portion of the leading edge of the component concentration profile which corresponds to the sector of the column in which the closed louver vanes are located. If, for example, a serious case of channeling existed in approximately one quadrant of the column (as it is considered in a cross-sectional sense) and such channeling permitted extensive fingering to develop in that sector of the advancing component concentration profile, this distortion could be combatted and largely eliminated by partially closing the bank of louver vanes 202 aligned with that portion of the advancing concentration profile so that the gases in that particular zone would encounter greater resistance to their continued flow through the column than would the lagging gases in the remaining portion of the component concentration profile. Substantially the same corrective action could be effected with any of the louver vane sectors provided in the column by selective movement of one or more of the control rods 196 to vary the effective porosity of the column at the location of the louver vanes.

Another embodiment of the invention is illustrated in FIGURES 14–17. A horizontal cross-section through a mixing zone column section 210 is illustrated with the tubular column section being surrounded by a relatively thick annular band 212 of a rigid material. The annular band 212 functions as a cantilever support member for a plurality of control elements each designated generally by reference character 214. The control elements 214 may be considered to function collectively as an internal within the chromatographic column, and can be used to reshape a distorted concentration profile. One of the control elements 214 is illustrated in FIGURE 14A and includes an elongated control rod 216 which carries at an end disposed outside of the column, a control knob 218 with which the control rod can be rotated about its longitudinal axis.

The control rod 216 is journaled in a relatively thick bearing sector 220 which is slidably received in a recess 222 which is complementary in configuration to the bearing sector and is provided in the outer portion of the annular band 212. A resilient sealing element 224 lines the recess 222 in the band 212 to sealingly engage the bearing sector 220 when it is pressed into the recess. Fixed to the bearing sector 220 for movement therewith and positioned immediately above the control rod 216 is a seal plate 228 which extends into a recess 229 complementary in configuration to the cross-sectional configuration of the seal plate and control rod, and located in the inner portion of the annular bad 212. The recess 229 snugly engages the seal plate 228 and control rod 216 to provide a gas tight seal therewith. Aligned with the seal plate 228 and in juxtaposition thereto is a louver vane 230 which is keyed to the control rod 216 for rotation therewith. The louver vane 230 is of identical cross-sectional configuration to the seal plate 228.

Before describing the cooperative or collective function of the control elements 214, it is believed that understanding of this embodiment of the invention will be promoted by referring initially to the several ways in which each individual control element may be manipulated. When the bearing sector 220 is fully seated in its respective recess 222 and the seal plate 228 is fully seated in its respective recess 229, the control knob 218 may be manually rotated to cause the louver vane 230 to be rotated about the axis of the control rod 216. On the other hand, by withdrawing the control element 214 partially from the column section 210, the bearing sector 220 is withdrawn from the annular band 212, the seal plate 228 is withdrawn from its respective recess 229, and the louver vane 230, if positioned by rotation of the control knob 218 in coplanar alignment with the seal plate 228, can be slidingly drawn through the seal plate recess 229 toward the outside of the column. In the course of such movement, the tight fitting recess 229 maintains a gas tight seal with the louver vane 230 and control rod 216 and prevents gas from escaping therearound to the outside of the column section 210.

Figure 14:
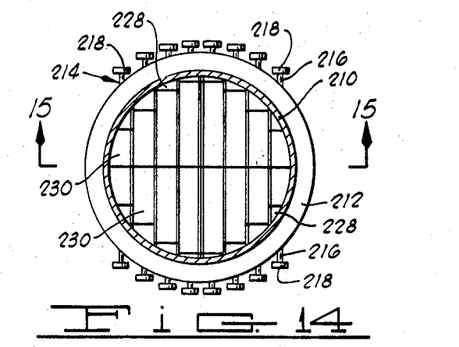
FIGURE 14 is a horizontal sectional view taken through a chromatographic column, and illustrating another type of component concentration profile reshaping or reorienting apparatus which can be utilized in the present invention.
Figure 14A:
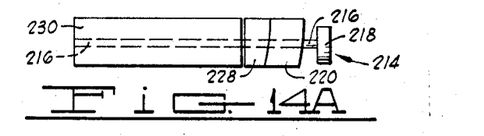
FIGURE 14A is a detail view illustrating a control element used in the embodiment of the invention shown in FIGURE 14.
Figure 15:
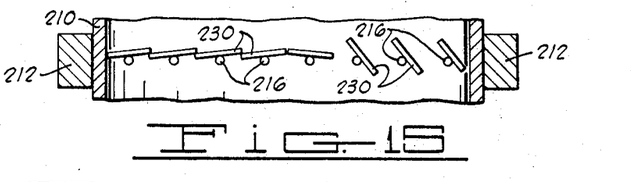
FIGURE 15 is a sectional view taken along line 15—15 of FIGURE 14.

FIGURES 14–17 of the drawings show the control elements 214 used in this embodiment of the invention in several operating positions. In FIGURES 14 and 15, the control elements 214 are each moved inwardly in the annular band 212 until the inner ends of the louver vanes 230 carried by the control rods 216 on opposite sides of the column section 210 are in contact. At this time the bearing sectors 220 and seal plates 228 are seated in their respective recesses 222 and 229. The louver vanes 230 can then be rotated by the use of the control rods 216 to selectively control the openings between the louver vanes. Thus, for example, as shown in FIGURES 14 and 15, wider openings can be provided between the louver vanes on the right side of the column section 210 than are provided on the left side of the column section. The louver vanes as thus controlled can be used to counteract fingering occurring on the left side of the column section, or any distortion which may be reflected by a more rapid advance of gases occurring on the left side of the column than on the right side of the column.

Figures 16, 18:
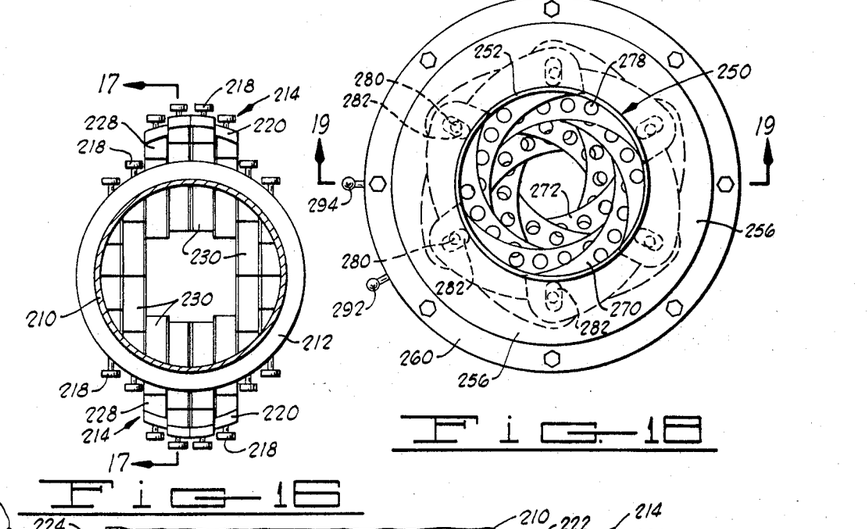
FIGURE 16 is a view similar to FIGURE 14, but showing the component concentration profile reshaping apparatus of FIGURE 14 in a different operating position for the purpose of differently reshaping a component concentration profile as the component moves through the column.
FIGURE 18 is a horizontal sectional view similar to FIGURES 14 and 16, but illustrating yet another embodiment which can be employed for reshaping component concentration profiles as gaseous components are separated and moved through the column.
Figures 17, 19, 20:
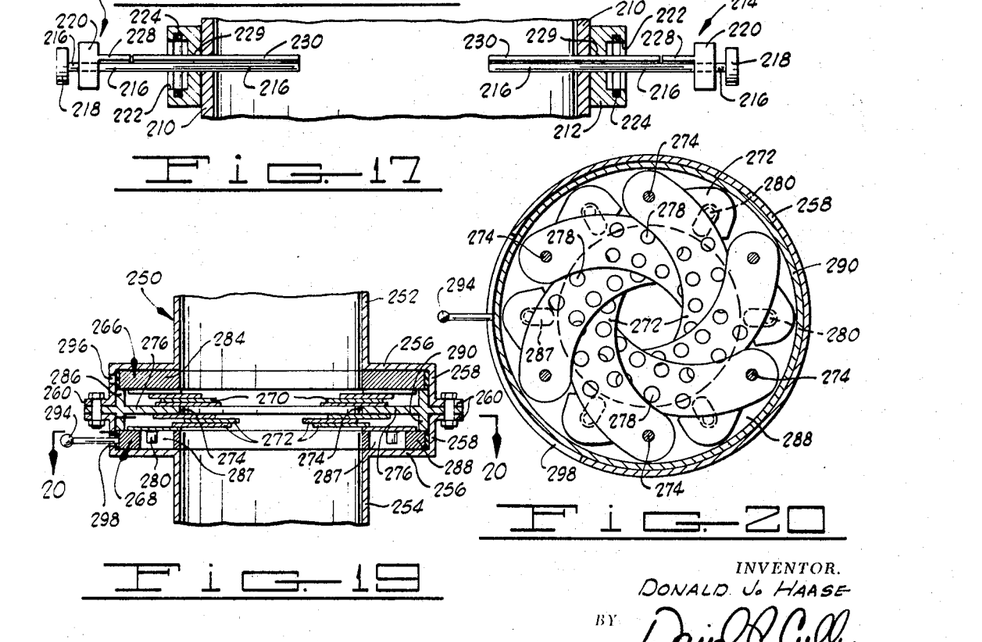
FIGURE 17 is a sectional view taken along line 17—17 of FIGURE 16.
FIGURE 19 is a sectional view similar to that depicted in FIGURE 18, but illustrating the profile reshaping structure in a different operating position.
FIGURE 20 is a sectional view taken along line 20—20 of FIGURE 19.

Another way of utilizing the control elements 214 is illustrated in FIGURES 16 and 17. Here, the control elements are positioned to reshape a component concentration profile which has been severely distorted by wall effect, and therefore has a pronounced concavity in its leading edge. This is accomplished by manipulating the control elements 214 to provide an obstruction to movement of gases adjacent the walls of the column section 210 while providing no obstruction at the center of the column. Thus, by alignment of the louver vanes 230 on the centrally located control elements 214 with the seal plates 228 thereon, these control elements may be partially withdrawn from the column section 210 so as to provide an opening of a desired size in the center of the column section. The control elements 214 located closer to the right and left sides of the column section 210, however, are allowed to remain in the position illustrated in FIGURE 14, and the louver vanes 230 of these particular elements are rotated to their closed position so that the column section is completely obstructed around the internal periphery thereof, and maximum resistance to gaseous flow is offered in this area. It will be noted, of course, that in addition to the two illustrated operating positions of the embodiment of the invention under discussion, the control elements 214 located on the right and left sides of the column cross-section as viewed in FIGURE 16 could be operated to provide partial openings between the respective louver vanes 230 carried by these elements so that total obstruction to fluid flow adjacent the column wall in this area would not be provided.

Yet another embodiment of the invention is illustrated in FIGURES 18, 19 and 20. In this embodiment, a mixing zone column section 250 is provided and includes an upper subsection 252 and a lower subsection 254. Both the upper and lower subsections 252 and 254 are provided with enlarged bores at their adjacent ends which are formed by radially outwardly extending flanges 256 and axially extending flanges 258. Connection flanges 260 are provided on both the upper and lower subsections 252 and 254 of the column section 250 to facilitate connecting these parts of the column section 250 together. When the upper and lower subsections 252 and 254 of the column section 250 are interconnected, as illustrated in FIGURE 19, the enlarged bores in the adjacent ends of each of the subsections conjunctively provide a chamber which is used to house an internal structure which includes two superimposed, variable opening diaphragms of the type utilized in photography. The upper diaphragm is designated generally by reference numeral 266 and the lower diaphragm by reference numeral 268.

Each diaphragm 266 and 268 includes a number of partially superimposed, arcuate, movable leaves which, in the illustrated embodiment of the invention, are six in number in the case of each of the diaphragms. The movable leaves of the upper diaphragm are designated by reference numeral 270, and the movable leaves of the lower diaphragm are designated by reference numeral 272. Each of the arcuate movable leaves 270 and 272 in the upper and lower diaphragms 266 and 268, respectively, is pivotally connected by a pin 274 positioned adjacent one of its ends to a stationary, radially inwardly extending annular plate 276 which is keyed to the column section 250 to prevent movement relative thereto. Each of the arcuate movable leaves 270 and 272 is provided with a plurality of perforations or slots 278 and, as will be hereinafter explained, the geometric arrangement of these slots is such that varying degrees of overlap between the slots in the superimposed arcuate leaves in each of the diaphragms 266 and 268 can be obtained as the diaphragms are operated.

At its end opposite the end carrying the pin 274, each of the arcuate, movable leaves 270 and 272 carries a second pin 280. In the case of the arcuate movable leaves 270 of the upper diaphragm 266, these pins 280 extend into radially extending slots 282 formed in an annular control ring 284 which is slidably mounted on a shoulder 286 formed on the annular plate 276 so that the control ring can be rotated about the axis of the column section 250. The pins 280 carried by the arcuate movable leaves 272 of the lower diaphragm 268 project downwardly from the leaves and are engaged by radially extending slots 287 formed in a control ring 288 of the lower diaphragm. The control ring 288 is slidably mounted between a second shoulder 290 formed on the annular plate 276 and the radially outwardly extending flange 256 of the subsection 254 of column section 250, and can be rotated about the axis of the column section.

In order to permit controlled rotation of the control rings 284 and 288 from outside of the column section 250, a pair of control levers 292 and 294 are provided, and are secured at their inner ends by a threaded connection to the control rings 284 and 288, respectively. The control levers 292 and 294 extend through circumferential slots 296 and 298 provided in the axially extending flanges 258 of the upper and lower subsections 252 and 254 of the column section 250. Thus, each of the control levers 292 and 294 can be manually moved in a circumferential direction with respect to the column 250 to cause a corresponding movement of the control rings 284 and 288, respectively. Movement of the control rings 284 and 288 in turn causes the overlapping arcuate movable leaves 270 and 272 of the respective diaphragms 266 and 268 to be pivoted inwardly so as to reduce the size of the opening which exists between the inner peripheral edges of the arcuate leaves in the respective diaphragm. This action of the photographic-type iris diaphragm is well understood in the art.

In utilizing the embodiment of the invention illustrated in FIGURES 18–20 for controlling component concentration profile distortion in a chromatographic column, the control levers 292 and 294 can be manipulated outside the column in order to control the degree to which each of the movable arcuate leaves in each diaphragm 266 and 268 is moved toward the center of the column or stated differently, the size of the opening formed between the leaves of each of the diaphragms. The control exercised over the diaphragm openings will in turn determine the extent of overlap of the sets of leaves 270 and 272 in the two diaphragms. In controlling this overlap, the degree of alignment between the perforations or slots 278 in the superimposed leaves can also be controlled. It will thus be seen that it is possible by the use of the two diaphragms 266 and 268 positioned transversely across the column section 250 to control both the effective porosity of the column in a cross-sectional direction, and to simultaneously control the size of the relatively large opening in the center of the column. Various porosity permutations can be obtained by judicious choice of the number, size and geometric configuration of the perforations 278 formed in the movable arcuate leaves 270 and 272 of the two diaphragms.

From the foregoing description of the invention, it will have become apparent that a highly effective means has been provided for controlling component concentration profile distortion in a chromatographic column. The exemplary structures which have been described are, in most instances, relatively inexpensive in construction and yet are mechanically strong and provide little operating difficulty, and few problems of maintenance. Some of the devices permit variable control which will prevent distortion due to a variety of influences, while others of the internal structures illustrated and described are intended primarily for correcting one particular type of distortion. In this connection, it should be pointed out that the principles of several of the internals which have been herein described can be combined in a single column to provide a more versatile system which will correct substantially any type of distortion which may occur in the column. Moreover, the external controls which have been disclosed, including those which are completely automatic, can be provided for many different types of internal structures to provide constant monitoring and correction of distortion in component concentration profiles.

Although several specific embodiments of the invention have been hereinbefore described in order to provide examples of how the invention may be practiced, it is to be understood that the description and illustration of these exemplary structures are not intended to be comprehensive of all structures which might be provided to achieve the objects of the invention by reliance upon the basic principles which have been herein considered in detail. Thus, various modifications in the structures shown and described could be effected without departing from the principles of the invention, and without failure to attain the objects achieved by the embodiments of the invention to which reference has been made. For example, many of the internals disclosed could be placed in packed column sections rather than in mixing zone column sections. All such modifications and innovations which continue to rely upon the basic principles of the invention are deemed to be circumscribed by the spirit and scope of the invention except as the same may be necessarily limited by the appended claims or reasonable equivalents thereof.

What is claimed is:
1. Gas chromatography apparatus comprising:
a column including at least one rigid column wall;
solid particulate packing material retained in a bed by the column wall and having a non-volatile liquid on the surface of the solid particles;
a gas inlet at one end of the column;
a gas outlet at the other end of the column; and
component concentration profile reshaping internal means disposed between the gas inlet and the gas outlet and extending across the path of flow of the gas through the column, said profile reshaping internal means including structure for establishing a gas flow resistance gradient across the column substantially normal to the direction of gas flow therethrough, said structure including adjustable means for making said gas flow resistance gradient asymmetrical with respect to the central axis of the column.

2. Gas chromatography apparatus as defined in claim 1 wherein said column comprises a plurality of packed tubular sections serially connected to each other, and wherein said profile reshaping internal means is positioned between two of said packed tubular column sections.

3. Gas chromatography apparatus as defined in claim 2 and further characterized to include a tubular section free of packing surrounding said profile reshaping internal means and positioned between, and connected to, said packed tubular sections.

4. Gas chromatography apparatus as defined in claim 1 wherein said column comprises a packed tubular member, and said chromatography apparatus is further characterized to include control means outside said column connected to said profile reshaping internal means for altering the characteristics of said internal means to selectively vary the resistance gradient across said column.

5. Gas chromatography apparatus as defined in claim 4 wherein said concentration profile reshaping means comprises a plurality of spaced heating elements; and said control means comprises means for selectively heating each of said heating elements.

6. Gas chromatography apparatus as defined in claim 4 wherein said profile reshaping internal means comprises a plurality of rigid elements each occupying a space less than the total cross-sectional area of the column and movably mounted in the column, and said control means comprises mechanical connections to said elements extending through at least one wall of said column and having portions outside said column movable to move said rigid elements in the column.

7. Gas chromatography apparatus as defined in claim 1 wherein said profile reshaping internal means comprises a plurality of heat exchange elements.

8. Gas chromatography apparatus as defined in claim 7 and further characterized to include means outside the column for changing the thermal characteristics of said heat exchange elements.

9. Gas chromatography apparatus as defined in claim 1 wherein said profile reshaping internal means comprises a plurality of rigid elements extending at least partially across the column substantially in a common plane passing through the column substantially normal to the direction of fluid flow therethrough, and spaced varying distances from each other in said plane for providing said gas flow resistance gradient.

10. Gas chromatography apparatus as defined in claim 9 wherein each of said rigid elements comprises an elongated, flat louver vane movably mounted in said column for rotation about a longitudinal axis extending transversely in the column normal to the direction of gas flow therethrough and vane moving means therefor.

11. Gas chromatography apparatus as defined in claim 1 wherein said profile reshaping internal means comprises constricting structure movably mounted in the column and movable therein to provide a variable size opening in the path of gas flow through the column.

12. Gas chromatography apparatus as defined in claim 11 wherein said constricting structure comprises a plurality of partially overlapping, arcuate leaves forming an iris diaphragm.

13. Gas chromatography apparatus as defined in claim 11 wherein said constricting structure is mounted in a cylindrical column section, and wherein said constricting structure comprises a plurality of elongated, rigid vanes extending slidably through the wall of said cylindrical column section and along chords of the circular cross-section of the cylindrical column section, said vanes projecting inwardly from opposite sides of the cylindrical column section with pairs of vanes aligned and having ends positioned to meet along a diameter of the column and vane moving means therefor.

14. Gas chromatography apparatus as defined in claim 1 wherein said profile reshaping internal means includes:
means for mechanically altering the resistance to gas flow through the column; and
means for thermally altering the resistance to gas flow through the column.

15. Gas chromatography apparatus as defined in claim 14 wherein said column is of circular cross-sectional configuration throughout, and wherein said profile reshaping means comprises:
a frusto-conical plate having an opening at its apex and positioned coaxially in the column with its lower peripheral edge secured to the column wall;
a plurality of concentric, annular heating elements disposed coaxially around the opening in the apex of said plate; and
means for individually heating and controlling said annular heating elements.

16. Gas chromatography apparatus as defined in claim 1 wherein said profile reshaping internal means includes rigid elements movably mounted in the column and including portions projecting through at least one of said rigid walls.

17. Gas chromatography apparatus as defined in claim 16 wherein said rigid elements each comprises:
an elongated, flat louver vane;
a control rod keyed to said lower vane and extending through a wall of the column; and
means rotatably and slidably supporting said control rod at the point where it passes through the column wall to permit said lower vane to be reciprocated in said column and rotated about its longitudinal axis.

18. Gas chromatography apparatus as defined in claim 1 and further characterized to include component concentration profile detecting means positioned in said column and spaced in the direction of said gas inlet from said profile reshaping internal means along the axis of gas flow though the column, and control means connected between said profile detecting means and said profile reshaping internal means for altering the characteristics of said profile reshaping internal means in response to signals developed by said profile detecting means:

19. Gas chromatograph apparatus as defined in claim 18 wherein said profile detecting means comprises a plurality of spaced thermistors disposed in an array to contact different portions of the leading edge of the concentration profile of a gaseous component moving through the column.

20. Gas chromatography apparatus comprising:
a column including at least one rigid column wall;
solid particulate packing material retained in at least one bed by the column wall;
a gas inlet at one end of the column;
a gas outlet at the other end of the column;
a mixing zone free of packing material within said column between said gas inlet and gas outlet;
component concentration profile reshaping internal means in said mixing zone and extending across the path of flow of gas through the column; and
said mixing zone being enclosed within and confined by a cylindircal section of said column, and said profile reshaping internal means comprising a plurality of concentric annular heating elements coaxilly positioned in said mixing zone and including means to individually heat and control said elements.

21. Gas chromatogaphy apparatus comprising:
a column including at least one rigid column wall;
solid particulate packing material retained in at least one bed by the column wall;
a gas inlet at one end of the column;
a gas outlet at the other end of the column;
a mixing zone free of packing material within said column between said gas inlet and gas outlet;
component concentration profile reshaping internal means in said mixing zone and extending across the path of flow of gas through the column; and
said mixing zone being enclosed within and defined by a cylindrical section of said column, and said profile reshaping means comprising a plurality of parallel elongated flat louver vanes each extending along a chord of the circular cross-section of the cylindrical column section, each such vane being moveably mounted and including means to moveably actuate same in said mixing zone for varying the spacing between such vanes.

22. Gas chromatography apparatus comprising:
a column including at least one rigid column wall;
solid particulate packing material retained in at least one bed by the column wall;
a gas inlet at one end of the column;
a gas outlet at the other end of the column;
a mixing zone free of packing material within said column between said gas inlet and gas outlet;
component concentration profile reshaping internal means in said mixing zone and extending across the path of flow of gas through the column; and
said mixing zone being enclosed within and defined by a cylindrical section of said column, and said profile reshaping means comprising at least one iris diaphragm having a plurality of moveable arcuate leaves partially superimposed on each other and including means to move said leaves with respect to each other.

23. Chromatography apparatus comprising:
a column including at least one rigid column wall;
solid particulate packing material retained in a bed by said column wall;
a gas inlet at one end of said column;
a gas outlet at the other end of said column;
component concentration profile reshaping internal means comprising a plurality of annular concentric heating elements disposed in said column between said inlet and said outlet and in a plane substantially normal to the direction of gas flow therethrough; and
control means external of said column operatively connected to said elements for individually heating and controlling same to alter the gas flow resistance gradient across said column.

24. Gas chromatography apparatus comprising:
a gas chromatography column having an upstream end and a downstream end;
solid particulate packing material retained in a bed by said column;
a plurality of heat exchange elements inside the column and selectively positioned across the path of gas flow through the column; and
means for selectively controlling the heat exchange characteristics of each of said heat exchange elements to establish a desired thermal gradient across the column.

25. Gas chromatography apparatus as defined in claim 24 wherein said column is cylindrical and wherein said heat exchange elements comprise a plurality of concentric annular electric heating elements disposed coaxially in said cylindrical column and individually heatable by said selective control means.

26. Gas chromatography apparatus as defined in claim 24 and further characterized to include a frusto-conical plate positioned adjacent said heat exchange elements for diverting gas from the walls of said column toward the center thereof.

27. Gas chromatography apparatus as defined in claim 24 and further characterized to include sensing means in said column and connected to said selective control means for sensing distortions in component concentration profiles in said column and transmitting signals to said selective control means.

28. Gas chromatography apparatus comprising:
a column including at least one rigid column wall;
solid particulate packing material retained in at least one bed by the column wall;
a gas inlet at one end of the column;
a gas outlet at the other end of the column;
a mixing zone free of packing material within said column between said gas inlet and gas outlet; and
profile reshaping structure within said mixing zone comprising moveably mounted rigid louver vane elements occupying a plane substantially normal to the longitudinal axis of said column and having spaces therebetween for permitting gas to flow therethrough, said vane elements being collectively mounted so that the space therebetween is varied by movement thereof, and including means to moveably actuate said vanes.

References Cited

UNITED STATES PATENTS

| 2,989,443 | 6/1961 | Martin | 55—67 |
| 3,135,108 | 6/1964 | Santeler | 55—197 X |
| 3,146,616 | 9/1964 | Loyd | 55—386 X |
| 3,230,167 | 1/1966 | Golay | 55—386 X |
| 3,250,058 | 5/1966 | Baddour | 55—197 X |
| 3,298,527 | 1/1967 | Wright | 55—386 X |
| 3,310,932 | 3/1967 | Melpolder | 55—386 |
| 3,315,736 | 4/1967 | Carel | 55—197 X |

OTHER REFERENCES

Journal of Chromatography, "A note on preparative scale gas chromatography," 9 (1962), 116—117, M. Verzele.

REUBEN FRIEDMAN, *Primary Examiner.*

J. L. DE CESARE, *Assistant Examiner.*

UNITED STATES PATENT OFFICE
CERTIFICATE OF CORRECTION

Patent No. 3,422,604  January 21, 1969

Donald J. Haase

It is certified that error appears in the above identified
patent and that said Letters Patent are hereby corrected as
shown below:

Column 3, line 13, "column and controlled from outside" should read -- column.

A further object of the invention is to provide variable reshaping means which can be positioned within a chromatographic column and controlled from outside --. Column 5, line 7, "path of the gasés" should read -- path of flow of the gases --. Column 10, line 44, "mixting" should read -- mixing --. Column 11, lines 21 and 22, "General Electric Con-control apparatus which is capable of functioning" should read -- General Electric Controller Rectifier Manual) and has not been described --. Column 14, line 56, "bad 212" should read -- band 212 --. Column 17, line 30, "lower" should read -- louver --.

Signed and sealed this 24th day of March 1970.

(SEAL)

Attest:

Edward M. Fletcher, Jr.  WILLIAM E. SCHUYLER, JR.
Attesting Officer  Commissioner of Patents